(12) United States Patent
Kim (10) Patent No.: US 9,797,457 B2
(45) Date of Patent: Oct. 24, 2017

(54) FIXED BALL TYPE JOINT FOR VEHICLE

(71) Applicant: Hyundai Wia Corporation, Gyeongsangnam-do (KR)

(72) Inventor: Pil Ki Kim, Gyeonggi-do (KR)

(73) Assignee: HYUNDAI WIA CORPORATION (KR)

( * ) Notice: Subject to any disclaimer, the term of this patent is extended or adjusted under 35 U.S.C. 154(b) by 0 days.

(21) Appl. No.: 14/653,762

(22) PCT Filed: Aug. 9, 2013

(86) PCT No.: PCT/KR2013/007201
§ 371 (c)(1),
(2) Date: Jun. 18, 2015

(87) PCT Pub. No.: WO2014/098343
PCT Pub. Date: Jun. 26, 2014

(65) Prior Publication Data
US 2016/0195140 A1    Jul. 7, 2016

(30) Foreign Application Priority Data

Dec. 18, 2012 (KR) .................. 10-2012-0148473

(51) Int. Cl.
*F16D 3/224* (2011.01)
*B60K 17/22* (2006.01)
(Continued)

(52) U.S. Cl.
CPC .............. *F16D 3/224* (2013.01); *B60K 17/22* (2013.01); *F16D 3/02* (2013.01); *F16D 3/20* (2013.01); *F16D 3/223* (2013.01); *Y10S 464/906* (2013.01)

(58) Field of Classification Search
CPC ....... F16D 3/223; F16D 3/224; Y10S 464/906
(Continued)

(56) References Cited

U.S. PATENT DOCUMENTS 2,150,952 A * 3/1939 Ward .................. B60K 17/165
464/906
4,000,629 A * 1/1977 Bellomo ............... F16D 3/2265
464/906
(Continued)

FOREIGN PATENT DOCUMENTS

EP    1458986 A1    9/2004
EP    2489894 A1    8/2012
(Continued)

OTHER PUBLICATIONS

International Search Report for PCT/KR2013/007201, dated Oct. 7, 2013.
(Continued)

*Primary Examiner* — Gregory Binda
(74) *Attorney, Agent, or Firm* — Stetina Brunda Garred and Brucker; Mark B. Garred (57) ABSTRACT

A fixed ball type joint for a vehicle, which reduces the friction between a cage and an outer race and friction between the cage and an inner race by changing shapes of an inner spherical diameter of the outer race and an outer spherical diameter of the inner race. The fixed ball type joint for a vehicle includes an inner race, an outer race installed at the outside of the inner race, a plurality of balls for transmitting rotational power of the inner race to the outer race, and a cage for supporting the balls. A first inner spherical radius of the outer race is set to be smaller than a second inner spherical radius of the outer race. A first outer spherical radius of the inner race is set to be larger than a second outer spherical radius of the inner race.

6 Claims, 9 Drawing Sheets

(51) Int. Cl.
*F16D 3/02* (2006.01)
*F16D 3/20* (2006.01)
*F16D 3/223* (2011.01)

(58) Field of Classification Search
USPC .................................... 464/145, 906
See application file for complete search history.

(56) References Cited

U.S. PATENT DOCUMENTS

| | | | |
|---|---|---|---|
| RE30,606 E * | 5/1981 | Sharp ................ | B60K 17/22 |
| 8,641,538 B2 * | 2/2014 | Oh ..................... | F16D 3/223 |
| | | | 464/906 |
| 2013/0310186 A1 | 11/2013 | Kim | |

FOREIGN PATENT DOCUMENTS

| | | |
|---|---|---|
| EP | 2530346 A2 | 12/2012 |
| JP | 2001153149 A | 6/2001 |
| JP | 4879501 B2 | 2/2012 |
| KR | 10-2004-0077686 | 9/2004 |
| KR | 1020100079651 A | 7/2010 |
| KR | 1020120134662 A | 12/2012 |

OTHER PUBLICATIONS

Extended European Search Report for EP Patent Application No. 13863816.8, dated Oct. 26, 2016.

* cited by examiner

FIXED BALL TYPE JOINT FOR VEHICLE

CROSS-REFERENCE TO RELATED APPLICATION

This application claims priority to and the benefit of Korean Patent Application No. 10-2012-0148473 filed on Dec. 18, 2012 in the Korean Intellectual Property Office, and all the benefits accruing therefrom under 35 U.S.C. 119, the contents of which in its entirety are herein incorporated by reference.

BACKGROUND

1. Field

The present invention relates to a fixed ball type joint for a vehicle, and more particularly, to a fixed ball type joint for a vehicle, which reduces the friction between a cage and an outer race and friction between the cage and an inner race by changing shapes of an inner spherical diameter of the outer race and an outer spherical diameter of the inner race.

2. Description of the Related Art

In general, a joint functions to transmit rotational power (torque) between two rotation shafts which meet each other at an angle. In the case of a propeller shaft having a small power transmission angle, a hook joint, a flexible joint, etc. are used, and in the case of the driving shaft of a front wheel drive vehicle having a large power transmission angle, a constant velocity joint is used.

Since the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine (i.e., the inboard-side end), and a ball type joint is provided to the other end of the shaft which faces a tire (i.e., the outboard-side end).

Figure 1:
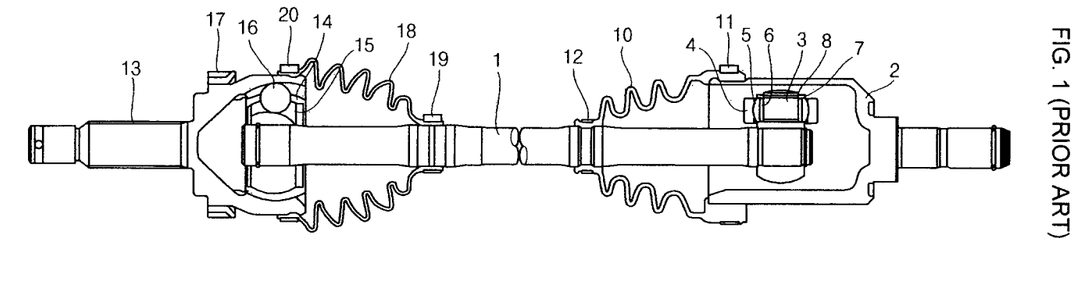
FIG. 1 is a cross-sectional view illustrating conventional constant velocity joints.
Figure 2:
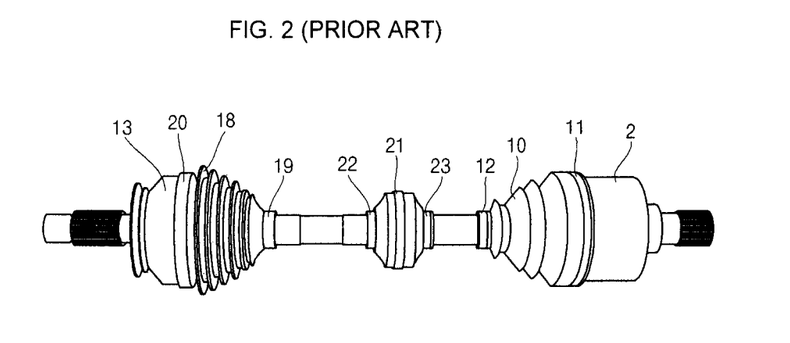
FIG. 2 is a schematic view illustrating an external appearance of the conventional constant velocity joints shown in FIG. 1.

FIG. 1 is a cross-sectional view illustrating conventional constant velocity joints, and FIG. 2 is a schematic view illustrating an external appearance of the conventional constant velocity joints shown in FIG. 1.

As shown in FIGS. 1 and 2, the conventional constant velocity joints comprise a tripod type constant velocity joint which is provided to an engine side with respect to a shaft 1 (the inboard-side end) and a fixed ball type joint provided to a wheel side with respect to the shaft 1 (the outboard-side end).

The tripod type joint installed on the engine side with respect to the shaft 1 (the inboard-side end) comprises a housing 2 which transmits rotational power of the engine (not shown) and is defined with track grooves on the inner surface thereof, the shaft 1 which receives the rotational power from the housing 2 and rotates, a spider 3 which is disposed in the housing 2, is coupled to one end of the shaft 1 to connect the housing 2 and the shaft 1 with each other and is formed with three trunnions to be respectively inserted into the track grooves of the housing 2, needle rollers 6 which are arranged on the circumferential outer surface of each trunnion of the spider 3, inner rollers 5 each of which is arranged around the needle rollers 6 for each trunnion of the spider 3, outer rollers 4 each of which is installed on the circumferential outer surface of each inner roller 5 to reduce friction between the housing 2 and the shaft 1, a strike out 7 which is installed on upper ends of the needle rollers 6 and of each inner roller 5, a circlip 8 for preventing the strike out 7 from being dislodged, a boot 10 having one end which is connected to the housing 2 and the other end which is connected to the shaft 1, and clamping bands 11 and 12 which clamp both ends of the boot 10.

In addition, the ball type joint installed on the wheel side with respect to the shaft 1 (the outboard-side end) comprises the shaft 1 which receives the rotational power from the housing 2 and rotates, an inner race 15 which is installed on one end of the shaft 1 to receive the rotational power from the tripod type constant velocity joint and to then rotate, an outer race 13 which is installed around the inner race 15, a plurality of balls 16 for transmitting the rotational power of the inner race 15 to the outer race 13, a cage 14 for supporting the balls 16, a sensor ring 17 which is installed around the outer race 13, a boot 18 having one end which is connected to the shaft 1 and the other end which is connected to the outer race 13, and clamping bands 19 and 20 which clamp both ends of the boot 18.

A damper 21 is installed at the center of the shaft 1 using bands 22 and 23 and has a weight installed in a body.

Hereafter, the operation of the conventional constant velocity joints constructed as mentioned above will be described.

As the rotational power outputted from an engine (not shown) is transmitted to the housing 2 through a transmission (not shown), the housing 2 is rotated. The rotational power of the housing 2 is transmitted to the spider 3 through the outer rollers 4, the inner rollers 5 and the needle rollers 6, and then the shaft 1 to which the spider 3 is coupled is rotated.

In addition, the rotational power of the shaft 1 is transmitted to the outer race 13 through the inner race 15 and the balls 16, and then the wheel (not shown) connected to the outer race 13 is rotated.

In this case, in the tripod type constant velocity joint which is provided to the engine side with respect to the shaft 1 (i.e., the inboard-side end), as the outer rollers 4 slide in the track grooves of the housing 2, the rotation angle of the shaft 1 which is operationally associated with the outer rollers 4 is changed, so that a joint angle is created to follow the displacement of a vehicle. In the ball type constant velocity joint which is provided to the wheel side with respect to the shaft 1 (i.e., the outboard-side end), the rotation angle of the outer race 13 is changed due to the presence of the balls 16, so that a joint angle is created to follow the displacement of the vehicle.

The boot 10 of the tripod type joint and the boot 18 of the ball type joint respectively function to enclose the tripod type joint and the ball type joint, so that the tripod type joint and the ball type joint are prevented from being contaminated by foreign contaminant substances.

In addition, when the torque outputted from the engine and the transmission is transmitted through the shaft 1 to wheels, unbalanced rotation may occur at a certain rotation angle of the shaft 1 rotating at high speed, which may result in undesired vibrations and adversely affect the operation of a drive system. In order to prevent the undesired vibrations due to unbalanced rotation, the damper 21 installed at the center of the shaft 1 may prevent booming noises from occurring to the shaft 1 rotating at high speed due to the detrimental vibration frequency.

Figure 3:
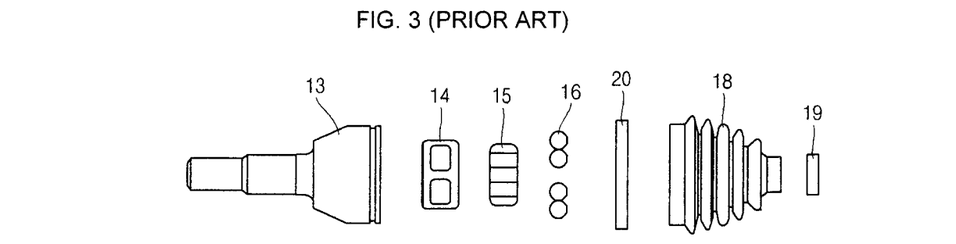
FIG. 3 is an exploded view illustrating a conventional ball type constant velocity joint for a vehicle.
Figure 4:
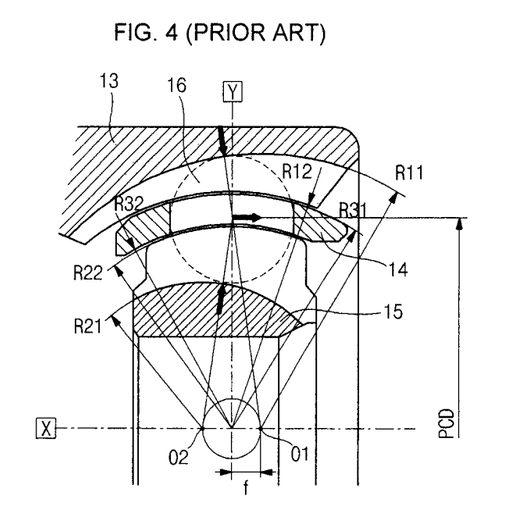
FIG. 4 is a perspective view illustrating essential parts of the conventional ball type constant velocity joint for a vehicle before a joint angle is created.
Figure 5:
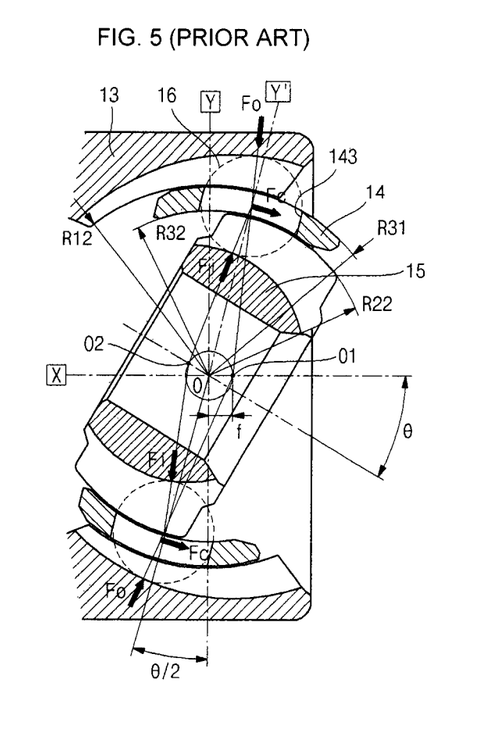
FIG. 5 is a perspective view illustrating essential parts of the conventional ball type constant velocity joint after a joint angle is created.

FIG. 3 is an exploded view illustrating a conventional ball type constant velocity joint for a vehicle, FIG. 4 is a cross-sectional view illustrating essential parts of the conventional ball type constant velocity joint for a vehicle before a joint angle is created, and FIG. 5 is a cross-sectional view illustrating essential parts of the conventional ball type constant velocity joint after a joint angle is created.

As shown in FIGS. 3 to 5, in the conventional ball type constant velocity joint for a vehicle, the balls 16 are fixed by the cage 14 and the inner race 15. During steering, the balls 16 are moved in a ball track formed on an inner spherical surface of the outer race 13 in a lengthwise direction.

A center O1 of a track radius R11 of the outer race 13 and a center O2 of a track radius R21 of the inner race 15 are symmetrical with each other with regard to a joint rotation center O and are offset by a constant offset amount f in a joint axial direction, that is, in the X-axis direction, to constrain the balls 16.

Here, when the inner race 15 receives a torque, an inner spherical radius R32 of the cage 14 and an outer spherical radius R22 of the inner race 15 come into contact with each other according to dynamic displacement of a steering device and a vehicle, so that a joint angle is created by θ with respect to the joint rotation center O.

In addition, as an outer spherical radius R31 of the cage 14 and an inner spherical radius R12 of the outer race 13 come into contact with each other, a joint angle is created in the cage 14 by an angle θ/2 with respect to the joint rotation center O, so that the balls 16 are constrained by a cage window 143 to be positioned on a Y plane, that is, a plane of the cage 14 located to correspond to a joint angle amount of θ/2.

When the rotational power is transmitted, a contact force Fo is created between a track of the outer race 13 and the balls 16 and a contact force Fi is created between a track of the inner race 15 and the balls 16. A cage axial ball division force Fc is generated by the contact forces Fo and Fi, thereby pushing the balls 16 toward an entrance of the outer race 13.

Accordingly, as frictional resistance is generated due to a component-to-component, a loss in torque transmission efficiency may be caused. The frictional resistance generated on the outer spherical radius R31 of the cage 14 and the inner spherical radius R32 of the cage 14 will now be described in more detail.

Figure 6:
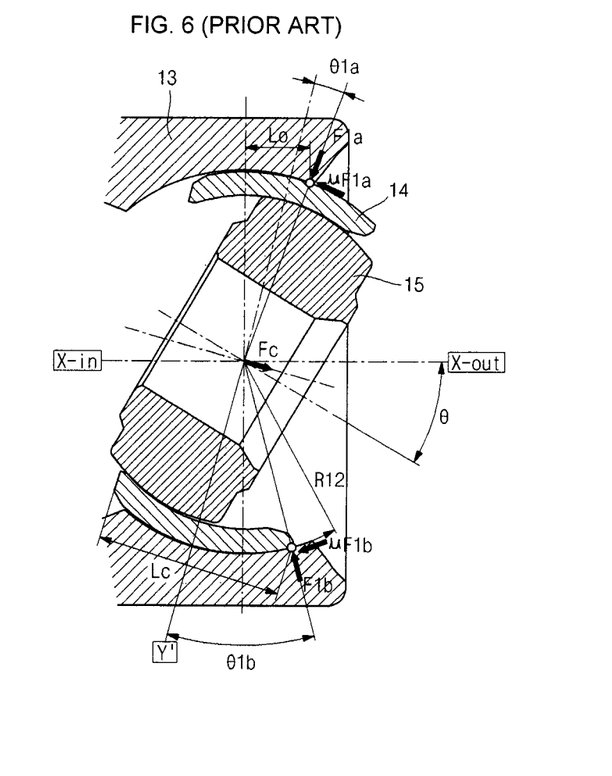
FIG. 6 is a perspective view illustrating essential parts of the conventional fixed ball type constant velocity joint for a vehicle to show friction between a cage and an outer race when a joint angle is created.

FIG. 6 is a perspective view illustrating essential parts of the conventional fixed ball type constant velocity joint for a vehicle to show friction between a cage and an outer race when a joint angle is created.

As shown in FIG. 6, when a joint angle of the inner race 15 is created by θ, contact points of the outer spherical radius R31 of the cage 14 and the inner spherical radius R12 of the outer race 13 are generated at ends of an outer race inner spherical surface length Lo and an outer diameter part of a cage width Lc due to the cage axial ball division force Fc and a tolerance between the two components, that is, between the outer race 13 and the cage 14. Here, frictional forces µF1a and µF1b are generated by contact forces F1a and F1b. The frictional forces µF1a and µF1b are proportional to contact angles θ1a and θ1b. That is to say, if the outer race inner spherical surface length Lo and the cage width Lc are increased, the contact angles θ1a and θ1b are increased and the frictional forces µF1a and µF1b are also increased. Therefore, in order to reduce the frictional forces µF1a and µF1b between the cage 14 and the outer race 13, it is necessary to reduce the contact angles θ1a and θ1b by reducing the outer race inner spherical surface length Lo and the cage width Lc.

Figure 7:
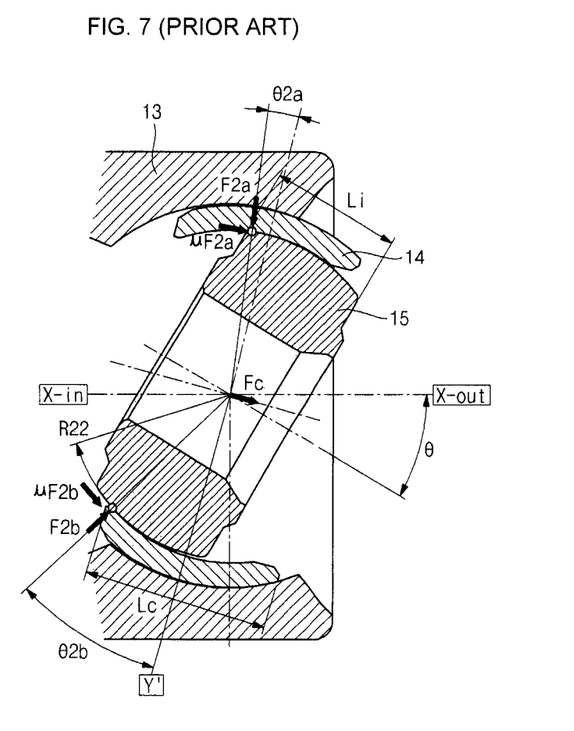
FIG. 7 is a perspective view illustrating essential parts of the conventional fixed ball type constant velocity joint for a vehicle to show friction between a cage and an inner race when a joint angle is created.

FIG. 7 is a perspective view illustrating essential parts of the conventional fixed ball type constant velocity joint for a vehicle to show friction between a cage and an inner race when a joint angle is created.

As shown in FIG. 7, when a joint angle of the inner race 15 is created by θ, contact points of the inner spherical radius R32 of the cage 14 and the outer spherical radius R22 of the inner race 15 are generated at ends of an inner race width Li and an inner diameter part of the cage width Lc due to the cage axial ball division force Fc and a tolerance between the two components, that is, between the cage 14 and the inner race 15. Here, frictional forces µF2a and µF2b are generated by contact forces F2a and F2b. The frictional forces µF2a and µF2b are proportional to contact angles θ2a and θ2b. That is to say, if the inner race width Li and the cage width Lc are increased, the contact angles θ2a and θ2b are increased and the frictional forces µF2a and µF2b are also increased. Therefore, in order to reduce the frictional forces µF2a and µF2b between the cage 14 and the inner race 15, it is necessary to reduce the contact angles θ2a and θ2b by reducing the inner race width Li and the cage width Lc.

As described above, in the conventional fixed ball type constant velocity joint for a vehicle, in order to reduce the frictional forces µF1a and µF1b between the cage 14 and the outer race 13 and the frictional forces µF2a and µF2b between the cage 14 and the inner race 15, it is necessary to reduce the contact angles θ1a, θ1b, θ2a and θ2b by reducing the cage width Lc, the outer race inner spherical surface length Lo and the inner race width Li. However, the reducing of the cage width Lc, the outer race inner spherical surface length Lo and the inner race width Li has limitation in view of joint strength and structure.

SUMMARY

Embodiments of the present invention provide a fixed ball type joint for a vehicle, which reduces the friction between a cage and an outer race and friction between the cage and an inner race by changing shapes of an inner spherical diameter of the outer race and an outer spherical diameter of the inner race.

The above and other aspects of the present invention will be described in or be apparent from the following description of exemplary embodiments.

According to an aspect of the present invention, there is provided a fixed ball type joint for a vehicle. The fixed ball type joint includes an inner race connected to one end of a shaft, an outer race installed at the outside of the inner race, a plurality of balls for transmitting rotational power of the inner race to the outer race, and a cage for supporting the balls. A first inner spherical radius of the outer race is formed at the inside with respect to an axis Y at which the balls are located when no joint angle is created and is set to be smaller than a second inner spherical radius of the outer race at the outside with respect to the axis Y when the axis Y is rotated in a clockwise direction by a first contact angle around a joint center. A track radius center of the outer race is formed at a position wherein the axis Y is rotated in a counterclockwise direction by a first rotating angle from the center of the second inner spherical radius of the outer race around the joint center. A first outer spherical radius of the inner race formed at the outside with respect to the axis Y at which the balls are located when no joint angle is created is set to be larger than a second outer spherical radius of the inner race at the inside with respect to the axis Y if the axis Y is rotated in a counterclockwise direction by a second contact angle around joint center. A track radius center of the inner race is formed at a position wherein the axis Y is rotated in a counterclockwise direction by a second rotating angle from the center of the second outer spherical radius of the inner race around the joint center.

A ratio of the second inner spherical radius of the outer race to the outer spherical radius of the cage may be in the range of 1.02 to 1.20.

A ratio of the first outer spherical radius of the inner race to the inner spherical radius of the cage may be in the range of 0.80 to 0.98.

The following relationships may be satisfied:

First rotation angle−First contact angle<90 degrees;

Second rotation angle+Second contact angle>90 degrees; and 90 degrees+First contact angle−First rotation angle=Second contact angle+Second rotation angle−90 degrees.

The first contact angle may be set to be greater than 5 degrees and smaller than 20 degrees.

The second contact angle may be set to be greater than 5 degrees and smaller than 25 degrees.

As described above, in the fixed ball type joint according to an embodiment of the present invention, the friction between a cage and an outer race and friction between the cage and an inner race can be reduced by changing shapes of an inner spherical diameter of the outer race and an outer spherical diameter of the inner race.

BRIEF DESCRIPTION OF THE DRAWINGS

The above and other features of the present invention will become more apparent by describing in detail exemplary embodiments thereof with reference to the attached drawings in which.

DETAILED DESCRIPTION

Hereinafter, examples of embodiments of the invention will be described in detail with reference to the accompanying drawings such that they can easily be made and used by those skilled in the art. Other advantages and features of the invention will also become apparent upon reading the following detailed description and upon reference to the accompanying drawings.

However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. For example, the term 'direction' is set on the basis of a position indicated on drawings for the sake of convenient explanation.

Figure 8:
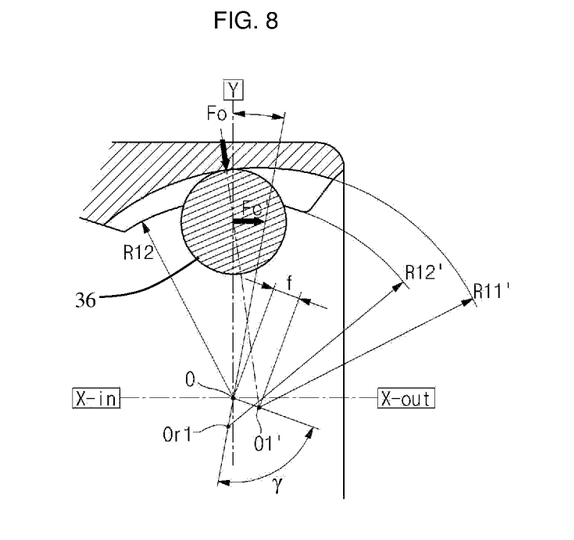
FIG. 8 is a perspective view illustrating essential parts of a fixed ball type constant velocity joint for a vehicle according to an embodiment of the present invention before a joint angle is created.
Figure 9:
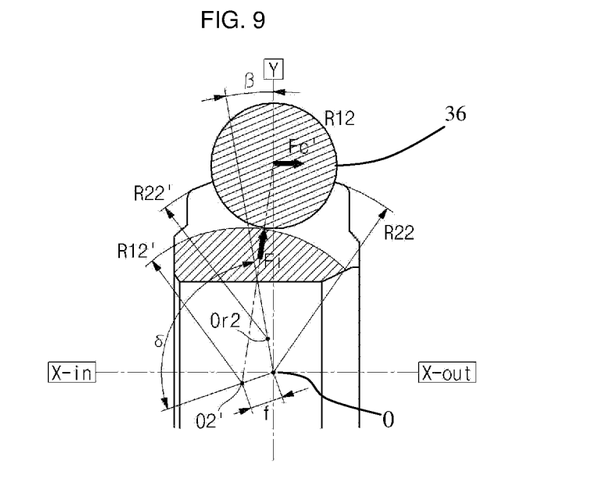
FIG. 9 is a perspective view illustrating essential parts of a fixed ball type constant velocity joint for a vehicle according to an embodiment of the present invention when a joint angle is created.
Figure 10:
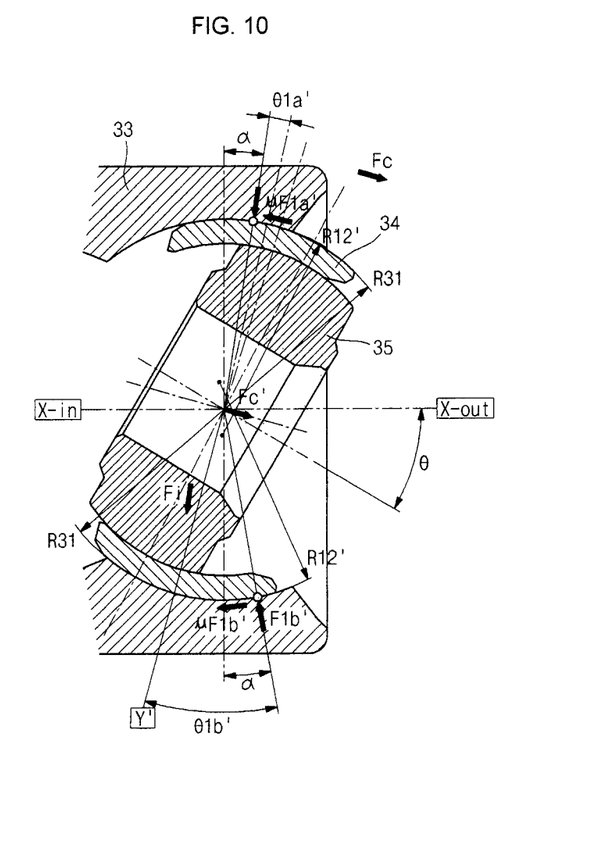
FIG. 10 is a perspective view illustrating essential parts of a fixed ball type constant velocity joint for a vehicle according to an embodiment of the present invention to show friction between a cage and an outer race when a joint angle is created.
Figures 10A, 10B:
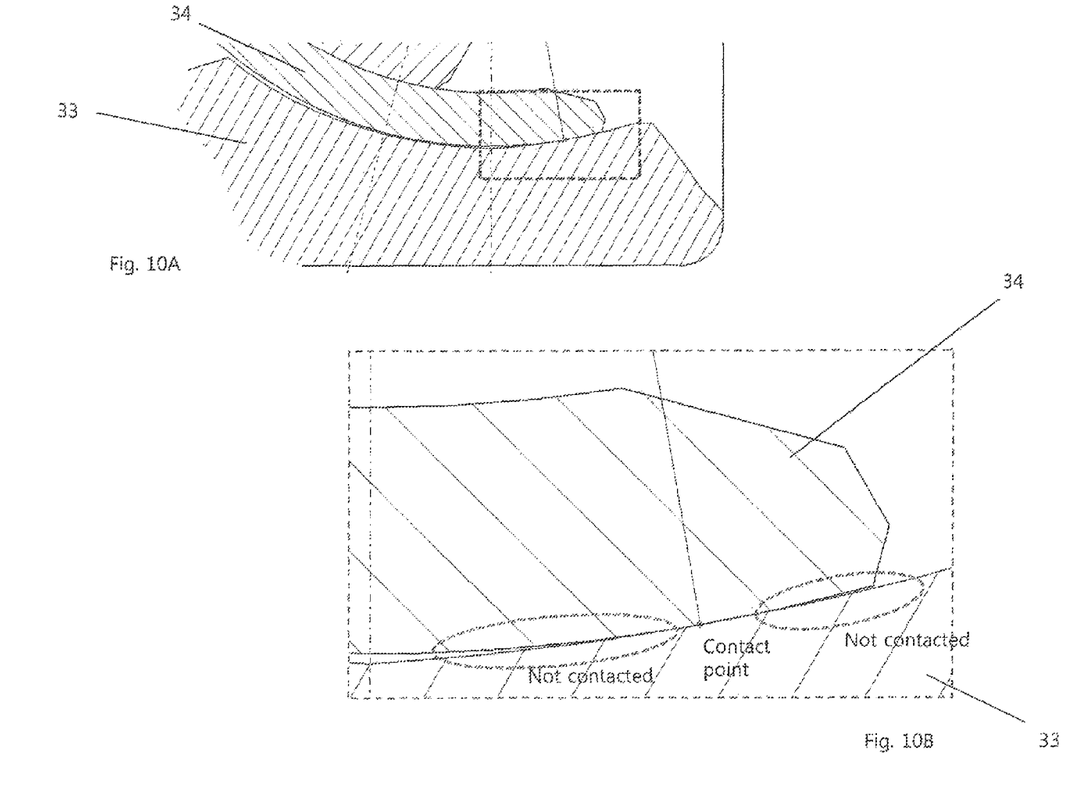
FIG. 10A is an enlarged view of a portion of the fixed ball type constant velocity joint depicted in FIG. 10.
FIG. 10B is an enlarged view of that which is depicted in FIG. 10A.
Figure 11:
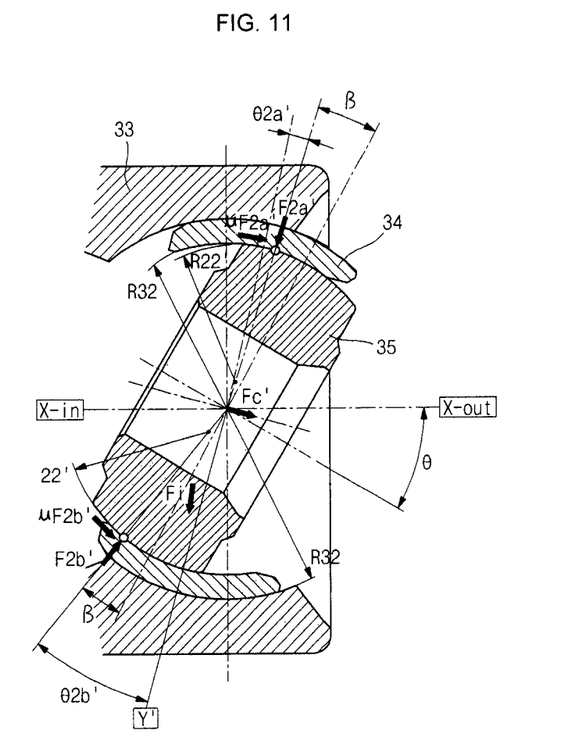
FIG. 11 is a perspective view illustrating essential parts of a fixed ball type constant velocity joint for a vehicle according to an embodiment of the present invention to show friction between a cage and an inner race when a joint angle is created.

FIG. 8 is a perspective view illustrating essential parts of a fixed ball type constant velocity joint for a vehicle according to an embodiment of the present invention before a joint angle is created, FIG. 9 is a perspective view illustrating essential parts of a fixed ball type angle constant velocity joint for a vehicle according to an embodiment of the present invention when a joint angle is created, FIG. 10 is a perspective view illustrating essential parts of a fixed ball type constant velocity joint for a vehicle according to an embodiment of the present invention to show friction between a cage and an outer race when a joint angle is created, with FIGS. 10A and 10B depicting enlarged views of a portion of that which is shown in FIG. 10 and FIG. 11 is a perspective view illustrating essential parts of a fixed ball type constant velocity joint for a vehicle according to an embodiment of the present invention to show friction between a cage and an inner race when a joint angle is created.

As shown in FIGS. 8 to 11, the fixed ball type joint for a vehicle according to an embodiment of the present invention includes an inner race 35 connected to one end of a shaft, an outer race 33 installed at the outside of the inner race 35, a plurality of balls 36 for transmitting rotational power of the inner race 35 to the outer race 33, and a cage 34 for supporting the balls 36. Here, a first inner spherical radius R12 of the outer race 33 formed at the inside (X-in) with respect to an axis Y at which the balls 36 are located when no joint angle is created is set to be smaller than a second inner spherical radius R12' of the outer race 33 at the outside (X-out) with respect to the axis Y when the axis Y is rotated in a clockwise direction by a first contact angle ($\alpha$) around a joint center O, and a track radius center O1' of the outer race 33 is formed at a position wherein the axis Y is rotated in a counterclockwise direction by a first rotating angle (γ) from the center Or1 of the second inner spherical radius R12' of the outer race 33 around the joint center O; and a first outer spherical radius R22 of the inner race 35 formed at the outside (X-out) with respect to the axis Y at which the balls 36 are located when no joint angle is created is set to be larger than a second outer spherical radius R22' of the inner race 35 at the inside (X-in) with respect to the axis Y if the axis Y is rotated in a counterclockwise direction by a second contact angle (β) around joint center O, and a track radius center O2' of the inner race 35 is formed at a position wherein the axis Y is rotated in a counterclockwise direction by a second rotating angle (δ) from the center Or2 of the second outer spherical radius R22' of the inner race 35 around the joint center O.

The second inner spherical radius R12' of the outer race 33 is greater than the outer spherical radius R31 of the cage 14. That is to say, a ratio of R12 to R31 is in the ratio of 1.02 to 1.20.

The first outer spherical radius R22 of the inner race 35 is smaller than the inner spherical radius R32 of the cage 14. That is to say, a ratio of R22 to R32 is in the ratio of 0.80 to 0.98.

The first rotation angle (γ), the second rotation angle (δ), the first contact angle (α), and the second contact angle (β) are set to satisfy the following relationships:

First rotation angle (γ)−First contact angle (α)<90 degrees;

Second rotation angle (δ)+Second contact angle (β)>90 degrees; and 90 degrees+First contact angle (α)−First rotation angle (γ)=Second contact angle (β)+Second rotation angle (δ)−90 degrees.

The first contact angle (α) is set to be greater than 5 degrees and smaller than 20 degrees and the second contact angle (β) is set to be greater than 5 degrees and smaller than 25 degrees.

Hereafter, the operation of the fixed ball type joint for a vehicle according to an embodiment of the present invention constructed as described above will be described.

If the inner spherical radius of the outer race 33 is divided into the inside (X-in) and the outside (X-out) with respect to the axis Y at which the balls 36 are located when no joint angle is created, the center of the inner spherical radius R12 of the outer race 33 disposed at the inside (X-in) corresponds to the joint center O, and the center Or1 of the inner spherical radius R12' of the outer race 33 disposed at the outside (X-out) is formed on the axis Y by rotating the axis Y in a counterclockwise direction by a first contact angle (α) around the joint center O.

As described above, the inner spherical radius of the outer race 33 is divided into the inside (X-in) and the outside (X-out) with respect to the axis Y and the inner spherical radius R12' of the outer race 33 disposed at the outside (X-out) is 1.02 to 1.20 times greater than the outer spherical radius R31 of the cage 34, thereby making the inner spherical radius R12' of the outer race 33 come into contact with the outer spherical radius R31 of the cage 34.

In addition, the center O1' of a track radius R11' of the outer race 33 is rotated in a counterclockwise direction by the first rotation angle (γ) from the center Or1 of the inner spherical radius R12' of the outer race 33 around the joint center O.

In this case, a ball division force (Fo) between a track of the outer race 33 and the balls 36 will now be briefly described. The ball division force of the axis Y is increased but the ball division force of the axis X is decreased, so that the cage axial ball division force Fc is reduced. Eventually, the contact forces F1a and F1b are reduced and the frictional forces μF1a and μF1b are also reduced. In this case, a difference (γ−α) between the first rotation angle (γ) and the first contact angle (α) should be smaller than 90 degrees. Accordingly, the frictional forces μF1a and μF1b between the inner spherical diameter of the outer race 33 and the outer spherical diameter of the cage 34 can be reduced.

Meanwhile, if the outer spherical radius of the inner race 35 is divided into the inside (X-in) and the outside (X-out) with respect to the axis Y at which the balls 36 are located when no joint angle is created, the center of the outer spherical radius R22 of the inner race 35 disposed at the outside (X-out) corresponds to the joint center O, and the center Or2 of the inner spherical radius R22 of the inner race 35 disposed at the inside (X-in) is formed on the axis Y by rotating the axis Y in a counterclockwise direction by a contact angle (β) around the joint center O.

As described above, the outer spherical radius of the inner race 35 is divided into the inside (X-in) and the outside (X-out) with respect to the axis Y and the outer spherical radius R12' of the inner race 35 disposed at the inside (X-in) is 0.80 to 0.98 times smaller than the inner spherical radius R32 of the cage 34, thereby making the outer spherical radius R12' of the inner race 35 come into contact with the inner spherical radius R32 of the cage 34.

In addition, the center O1' of the track radius R11' of the outer race 33 is rotated in a counterclockwise direction by the first rotation angle (γ) from the center Or1 of the inner spherical radius R12' of the outer race 33 around the joint center O.

In this case, a ball division force (Fi) between a track of the inner race 35 and the balls 36 will now be briefly described. The ball division force of the axis Y is increased but the ball division force of the axis X is decreased, so that the cage axial ball division force Fc is reduced. Eventually, the contact forces F2a and F2b are reduced and the frictional forces μF2a and μF2b are also reduced. In this case, a sum (δ+β) of the second rotation angle (δ) and the second contact angle (β) should be greater than 90 degrees. Accordingly, the frictional forces μF2a and μF2b between the outer spherical diameter of the inner race 35 and the inner spherical diameter of the cage 34 can be reduced.

The following table shows lost momentums between the outer race 33 and the cage 34 depending on the reduction of the first contact angle (α) and axial clearances measured when a pitch circle diameter (POD) is 63 mm, the first rotation angle (γ) is 85 degrees, and a torque of 3300 Nm is applied to a joint having a second rotation angle (δ) of 95.

| First Contact angle (α) | 15 | 10 | 5 | 3 |
|---|---|---|---|---|
| Lost momentum (Nm) | 8.51 | 8.37 | 8.27 | 8.20 |
| Axial Clearance (mm) | 0.33 | 0.36 | 0.40 | 0.44 |

As confirmed from the above table, as the first contact angle (α) is reduced, the lost momentum is reduced but the axial clearance is increased. Therefore, the first contact angle (α) is preferably set to be greater than 5 degrees and smaller than 20 degrees.

The following table shows lost momentums between the inner race 35 and the cage 34 depending on the reduction of the second contact angle (β) and axial clearances measured when a pitch circle diameter (PCD) is 63 mm, the first rotation angle (γ) is 85 degrees, and a torque of 3300 Nm is applied to a joint having a second rotation angle (δ) of 95.

| Second Contact angle | 15 | 10 | 5 | 3 |
|---|---|---|---|---|
| Lost momentum (Nm) | 9.39 | 9.28 | 9.24 | 9.22 |
| Axial Clearance (mm) | 0.33 | 0.35 | 0.39 | 0.43 |

As confirmed from the above table, as the second contact angle (β) is reduced, the lost momentum is reduced but the axial clearance is increased. Therefore, the second contact angle (β) is preferably set to be greater than 5 degrees and smaller than 25 degrees.

The present invention can be applied to a field of automotive vehicles.

While the fixed ball type joint for a vehicle according to the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A fixed ball type joint for a vehicle, comprising:
   an inner race connected to one end of a shaft;
   an outer race installed at the outside of the inner race;
   a plurality of balls for transmitting rotational power of the inner race to the outer race; and
   a cage for supporting the balls;
   the inner race and the outer race defining respective arcuate paths along which the plurality of balls may travel when the outer race assumes an angled configuration relative to the inner race;
   wherein:
      a first inner spherical radius of the outer race formed at the inside with respect to an axis Y at which the balls are located when no joint angle is created is set to be smaller than a second inner spherical radius of the outer race at the outside with respect to the axis Y when the axis Y is rotated in a clockwise direction by a first contact angle around a joint center, and
      a track radius center of the outer race is formed at a position wherein the axis Y is rotated in a counterclockwise direction by a first rotating angle from the center of the second inner spherical radius of the outer race around the joint center, and
      a first outer spherical radius of the inner race formed at the outside with respect to the axis Y at which the balls are located when no joint angle is created is set to be larger than a second outer spherical radius of the inner race at the inside with respect to the axis Y if the axis Y is rotated in a counterclockwise direction by a second contact angle around joint center, and
      a track radius center of the inner race is formed at a position wherein the axis Y is rotated in a counterclockwise direction by a second rotating angle from the center of the second outer spherical radius of the inner race around the joint center,
      the second inner spherical radius of the outer race is greater than an outer spherical radius of the cage, and the first outer spherical radius of the inner race is smaller than an inner spherical radius of the cage.

2. The fixed ball type joint of claim 1, wherein a ratio of the second inner spherical radius of the outer race to an outer spherical radius of the cage is in the range of 1.02 to 1.20.

3. The fixed ball type joint of claim 1, wherein a ratio of the first outer spherical radius of the inner race to an inner spherical radius of the cage is in the range of 0.80 to 0.98.

4. The fixed ball type joint of claim 1, wherein the following relationships are satisfied:

First rotation angle−First contact angle<90 degrees;

Second rotation angle+Second contact angle>90 degrees; and 90 degrees+First contact angle−First rotation angle=Second contact angle+Second rotation angle−90 degrees.

5. The fixed ball type joint of claim 4, wherein the first contact angle is set to be greater than 5 degrees and smaller than 20 degrees.

6. The fixed ball type joint of claim 4, wherein the second contact angle is set to be greater than 5 degrees and smaller than 25 degrees.

* * * * *